Sept. 8, 1970   R. W. BONLIE   3,527,580

CHARCOAL BRIQUETTE AND MANUFACTURE THEREOF

Filed March 6, 1967

RUSSELL W. BONLIE
INVENTOR

BY
BUCKHORN, BLORE, KLARQUIST & SPARKMAN
ATTORNEYS

# United States Patent Office 3,527,580
Patented Sept. 8, 1970

3,527,580
CHARCOAL BRIQUETTE AND
MANUFACTURE THEREOF
Russell W. Bonlie, 4360 Philomath Road,
Corvallis, Oreg. 97330
Filed Mar. 6, 1967, Ser. No. 620,970
Int. Cl. C10l 5/06, 5/32
U.S. Cl. 44—11                    16 Claims

ABSTRACT OF THE DISCLOSURE

Charcoal briquettes are coated with a fibrous material, e.g. paper pulp impregnated with an oxidant for enhancing their ignition and ease of handling. The pulp and oxidant mixture may be sprayed onto individual pressed briquettes, or applied thereto in the form of paper mat impregnated with oxidant and pressed onto the briquettes.

BACKGROUND OF THE INVENTION

Figure 1:
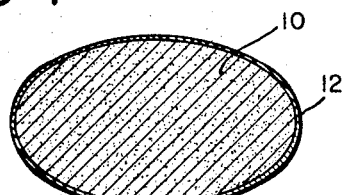

Charcoal briquettes are commonly employed as a fuel and are particularly advantageous when used for outdoor cooking. However, among the disadvantages of this type of fuel are difficulties in starting the charcoal and the problems in handling the charcoal. The charcoal tends to soil the hands of the user and other surfaces with which the charcoal briquettes may come in contact, making difficult the maintenance of cleanliness in the preparation of food.

Kindling of charcoal briquettes may be aided with the use of an electric starting element or by means of application of a flammable liquid thereto. Each of these methods involves a certain amount of danger to the individual and also does not insure an even and quick ignition of the fuel.

As an alternative ignition aid, charcoal mixtures have been employed which include oxidant material dispersed through the charcoal. However, inasmuch as the oxidant material is relatively expensive as compared with the cost of the charcoal, use thereof unduly increases the price of the final product. Moreover, when oxidants are added to the charcoal, the rate of combustion of the charcoal is accelerated to the point where the fuel may be consumed before sufficient cooking time has elapsed. In order to overcome the latter difficulty, anhydrous salts may be added to the mixture for retaining water and slowing down the combustion. However, this procedure limits the amount of useful heat available.

As a further ignition aid, a relatively non-coherent charcoal, e.g. a powder, may be packaged in containers for improving the ignition and handling properties thereof. However these containers are usually somewhat bulky and expensive and generally do not enhance the economical handling, placement and ignition of conventional briquettes.

SUMMARY OF THE INVENTION

According to the present invention as individual pressed briquette comprises charcoal with a binder therefor, and is provided with a coating adhered to the surface of the briquette. Such coating, which may be sprayed on the individual briquette, preferably comprises a mixture of a combustible fibrous material such as paper pulp, and an oxidant salt such as sodium nitrate. The coating is tightly adhered to the pressed briquette and the briquette may be conveniently ignited therefrom, e.g. by simply applying a flame to the coating. The coating provides ignition for the whole briquette as well as ignition for the complete surface of other briquettes located in a common bed of such briquettes in a very short period of time. However, the charcoal briquettes, after having been ignited, continue to burn in a conventional manner inasmuch as the coating substantially disappears.

Before ignition thereof, the briquettes may be transported and arranged in the same manner as conventional briquettes, but without soiling the hands of the user. Moreover, since the coating is fairly thin, inexpensive, and easy to apply in accordance with the present invention, the cost of the briquettes is not greatly increased.

In accordance with various method and apparatus aspects of the present invention, the coating may be applied to the briquettes by spraying a pulp and oxidant mixture thereon, or the coating may be pressed on in the form of a mat impregnated with the oxidant material. In accordance with the last mentioned method, first and second webs of fibrous material impregnated with an oxidant are pressed on to either side of the briquettes during or after the formation of the briquettes themselves.

It is accordingly an object of the present invention to provide a quick igniting briquette at a cost close to the cost of the conventional briquette.

It is a further object of the present invention to provide such a briquette having a clean surface so that the briquettes can be handled during the preparation of food or the like without smudging the hands or other surfaces.

It is another object of the present invention to provide an improved quick starting but long burning briquette, providing the heat of a conventional briquette.

Another object of the present invention is to provide charcoal briquettes with an igniting and handling coating which substantially disappears after ignition of the briquette.

Another object of the present invention to provide safer and cleaner means for handling and starting charcoal briquettes.

The subject matter which I regard as my invention is particularly pointed out and distinctly claimed in the concluding portion of this specification. The invention, however, both as to organization and method of operation together with further advantages and objects thereof, may best be understood by reference to the following description taken in connection with the accompanying drawings wherein like reference characters refer to like elements.

DRAWINGS

Figure 2:
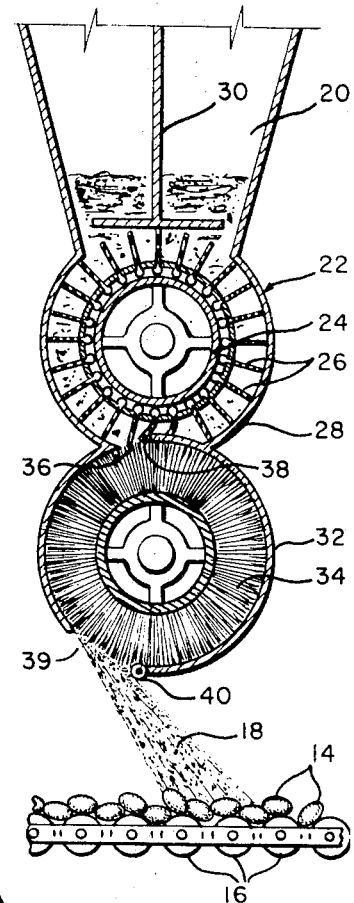
Figure 3:
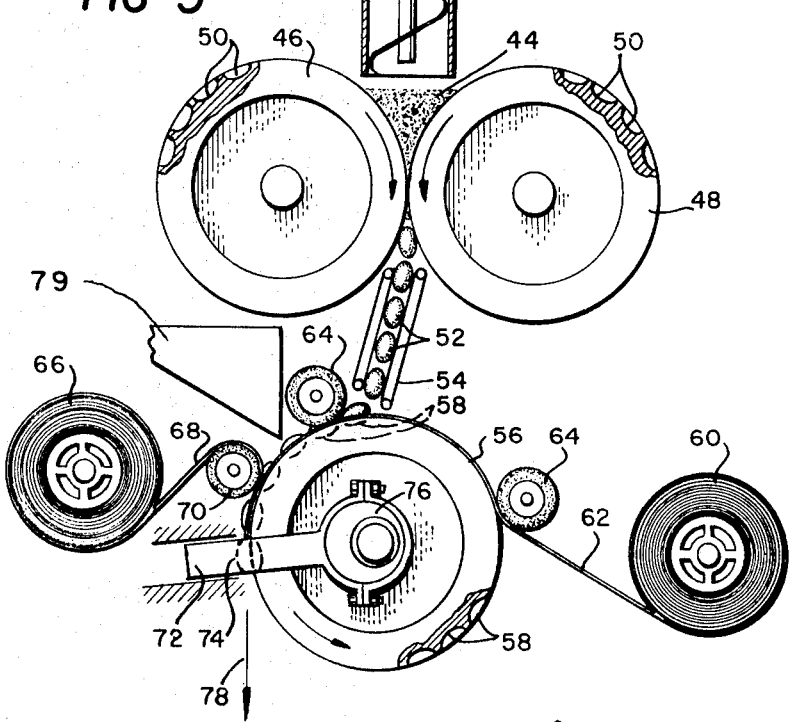
Figure 4:
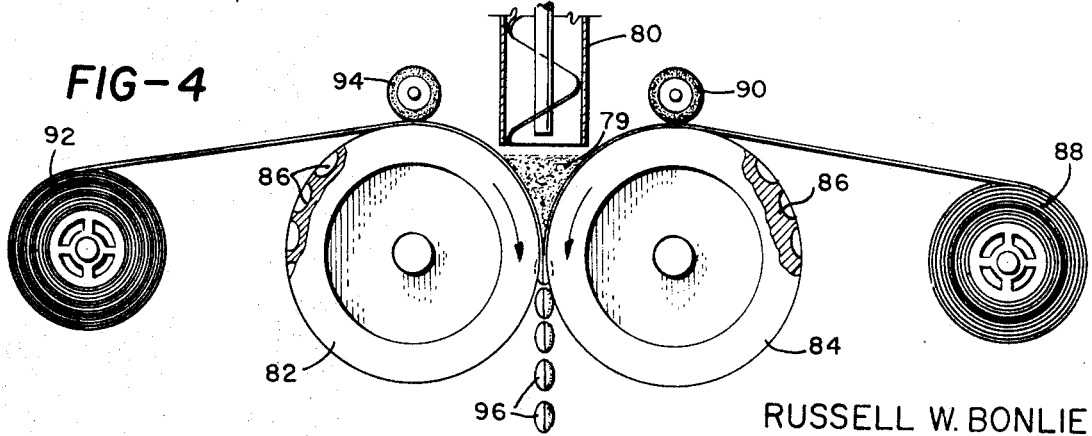

FIG. 1 is a cross section of a charcoal briquette in accordance with the present invention, FIG. 2 is a cross section of a first apparatus employed in the manufacture of such briquettes, FIG. 3 is a cross section of a second apparatus employed in the manufacture of briquettes, and FIG. 4 is a cross section of a third apparatus employed in the manufacture of charcoal briquettes according to the present invention.

DETAILED DESCRIPTION

Referring to FIG. 1, a briquette according to the present invention includes a conventional pressed charcoal briquette interior 10. The charcoal material may be formed from wood, vegetable matter, coal or fruit pits. Wood makes a hard, dense charcoal which is most desirable. The briquette interior also includes approximately 5% starch binder as well as a small amount of borax, the borax being used to improve the adhesiveness of the binder. The most commonly used binders are wheat or corn starch or a combination of the two. These materials give excellent strength to a briquette before it is cured, and good final strength, while having substantially no effect upon the taste of food being cooked thereover.

An adherent coating 12 is provided on the outside of the briquette which is substantially impervious insofar as protecting the hands and other surfaces from the charcoal is concerned. This fibrous material is preferably initially a pulp, for example paper pulp as produced in a paper mill or the like, or formed from old paper. In the latter case, the paper is separated into fibers in a slurry. Also the pulp can be formed from sawdust or vegetable matter such as straw broken up into a pulp.

The pulp is initially wet but dries on the briquette forming a coating having a thickness desirably between $\frac{1}{16}$ inch and $\frac{1}{32}$ of an inch. The pulp material also contains wax or preferabily an oxidant salt, the latter preferably comprising potassium nitrate, calcium nitrate, magnesium nitrate or sodium nitrate. Sodium nitrate is preferred since it does not tend to absorb moisture as readily as calcium nitrate and is relatively less expensive than potassium nitrate or magnesium nitrate. The proportion of nitrate in the nitrate and pulp mixture can vary from 15% to 75% depending on the moisture content of the briquette as finally produced. If the final product includes 3% to 5% water, then a proportion of sodium nitrate may be from 30% to 60% of the total mixture. Inasmuch as the oxidant material is more expensive than the pulp, and for other reasons, the lower moisture content is desired. However, if 15% or more water is included in the final product, then as much as 75% nitrate is desirable in the final coating. When calcium nitrate is used, the proportion of such oxidant material applied may be increased from the above figures.

Of course, the oxidant material may also be varied in quantity depending on the thickness and density of the coating and the speed of ignition that may be desired. Too much oxidant will cause the coating of the briquette to burn off rapidly when same is ignited, but heat is dissipated too rapidly to bring the briquette to its ignition temperature. On the other hand, too little oxidant does not produce sufficient heat to readily ignite the briquette. From this standpoint, the proportion of oxidant in the oxidant-paper combination is desirably in the range of 30% to 60%, e.g. in the case of the nitrates mentioned. In general the preferred oxidant percentage should be within this range for preferred coating thickness on the order of between $\frac{1}{16}$ and $\frac{1}{32}$ of an inch. The thinner coatings may contain a greater percentage of oxidant. One desirable coating includes approximately equal parts of sodium nitrate and paper pulp at a coating thickness of approximately $\frac{1}{16}$ inch.

In an exemplary method of providing a charcoal briquette according to the present invention, 4% to 10% corn or wheat starch as a binder was added to the charcoal with approximately $\frac{1}{10}$ of 1% borax. The mixture also initially contained 25% to 40% water and was thoroughly mixed. From this mixture, conventional charcoal briquettes were formed under a pressure between 600 and 5,000 p.s.i.

A coating mixture was then prepared. The paper pulp was formed and the oxidant material was then mixed therewith. A slurry was formed of approximately one part paper to five to ten parts water and then one part of oxidant material, e.g. nitrate, was added. Alternatively, the pulp may be formed with ten parts water to one part paper and then approximately one-half the water may be removed before the addition of the oxidant. In one instance the coating mixture was composed of one part paper, 1.1 parts sodium nitrate and eight parts water. This mixture was applied to the charcoal briquettes in a coating apparatus wherein as much as five to six parts of the water were lost.

The coating mixture may be applied to newly formed charcoal briquettes wherein the briquettes contain as much as 30% or 40% moisture. The coating mixture as finally applied to the briquettes may be about two to three parts water, one part paper and one part nitrate. Too thin a pulp, that is, containing too much moisture, will unduly wet the briquette and may cause disintegration of the same. However, too dry a pulp will not adhere to the briquettes.

When a mixture of wax and fibrous material is used, the wax is emulsified in water mixed with the fibrous material.

The coated briquettes are then dried in an oven for an extended period of time to reduce the moisture content in the briquettes desirably to 3% to 5%. The briquettes are suitably dried in such an oven at a temperature between 200° and 400° Fahrenheit for a period of about four ot six hours. In one example, the briquettes were dried for six hours at 260° Fahrenheit.

FIG. 2 illustrates an apparatus for applying pulp mixture to charcoal briquettes to form a coating thereon. The briquettes 14 are moved over conveying means comprising rotating rollers 16 disposed adjacent means for spraying pulp mixture 18 directly toward the moving briquettes. The spray applying means includes an inlet hopper 20 for receiving the pulp mixture and a pump 22 at the lower end thereof. Pump 22 includes a rotating wheel 24 provided with a plurality of rubber vanes 26 at the periphery thereof extending nearly to surrounding housing 28, the latter communicating with the bottom of hopper 20. An agitator 30 distributes the pulp mixture on to the vanes 26. A second housing 32, which is located adjacent to housing 28, concentrically surrounds a rotating brush 34. This brush, which is preferably provided with a multiplicity of wire tines or bristles, rotates in a counter-clockwise direction at a relatively high rate of speed, e.g. 3600 r.p.m. Housing 32 is provided with an inlet opening 36 communicating to the interior of housing 28. The edge 38 of inlet opening 36 engages rubber vanes 26 causing the discharge of the pulp through opening 36 onto rotating brush 34. Housing 32 is provided with exit opening 39 at a position for permitting tangential exit of the pulp mixture 18 from wire brush 34 towards the moving briquettes. The rotating brush 34, rotating in a counter-clockwise direction, sprays or throws pulp mixture 18 onto moving briquettes 14. A rotating shaft 40 prevents build-up of pulp at exit opening 39. The tines or bristles of the brush advantageously separate the pulp into a mist or spray directed towards the briquettes and the briquettes are moved on rollers 16 at a rate for providing a proper thickness of coating on the briquettes. Of course, after receiving the coating the briquettes are dried as hereinbefore indicated. The brush 34 may be provided with tines or bristles of a synthetic fiber such as nylon or the like instead of wire if desired.

FIG. 3 illustrates a second apparatus for applying a coating to briquettes in accordance with the present invention. This apparatus also includes means for initially pressing the briquettes from charcoal. A screw conveyor 42 discharges charcoal 44 including a binder towards and between a pair of counter-rotating press wheels 46 and 48, the peripheries of which join and which are provided with matching cups 50. As the wheels rotate, these cups 50 are located in juxtaposition to provide a briquette-forming cavity where the press wheels meet. Charcoal 44 is pressed by these cups into charcoal briquettes 52 and these briquettes are conveyed along a chute 54. At the lower end of chute 54 a cupped wheel 56 is positioned for receiving these briquettes in cups 58 thereof. Cupped wheel 56 here rotates in a counter-clockwise direction.

A first roll 60 of paper mat material treated with an oxidant salt unrolls in a web 62 onto the surface of cupped wheel 56 before wheel 56 passes chute 54. This web is pressed onto wheel 56 by means of soft rubber roller 64 and tends to be pressed into cups 58 thereof. Then briquettes 52 are received in the cups from chute 54. As the briquettes pass under soft rubber roller 64, the briquettes are pressed into the cups as lined with paper mat material.

A second roll 66 of paper mat material treated with oxidant salt unrolls a web 68 of such material around the soft rubber roller 70 and onto cupped wheel 56. Soft rubber roller 70 presses the web onto the top or exposed surface of the briquettes. The briquettes then pass a punching means 72 having a face 74 shaped to engage the briquettes and an edge for cutting or punching the paper web around the periphery of the briquettes to separate the briquettes therefrom. The punching means 72 is driven by a cam 76 arranged to rotate one revolution as wheel 56 rotates the spacing of one cup in the wheel. The completed briquettes then drop out as indicated by arrow 78. Air duct 79 removes loose particles.

The paper mat web 62 and 68 is impregnated with oxidant salt, e.g. sodium nitrate, dissolved in water, and the percentage of nitrate in the paper-nitrate mixture is in the range of 30% to 60% of the total of the two. Alternatively wax emulsified in water may be used although an oxidant salt is preferred. The paper mat is a loosely formed fibrous material, e.g. formed of paper pulp and is wet. When pressed onto the briquettes with punching means 72, the mat forms a coating on the briquettes similar to the sprayed-on coating. The briquettes are then dried.

Referring to FIG. 4, a further apparatus is illustrated for providing a coating on charcoal briquettes according to the present invention. In the FIG. 4 embodiment, the briquettes are formed and provided with a coating at the same time. The charcoal material and binder as indicated at 79 is provided by means of a screw conveyor 80 between a pair of counter-rotating press wheels 82 and 84 having matching cups 86 which are juxtaposed where the press wheels meet so as to provide a briquette-forming cavity therebetween. A first roll 88 of paper mat material impregnated with an oxidant salt is unrolled upon press wheel 84 and pressed thereupon with soft rubber roller 90. A second roll 92 of paper mat material also impregnated with an oxidant salt is unrolled upon press wheel 82 and urged thereagainst by soft rubber roller 94. As the charcoal 79 is compressed between the press wheels to form charcoal briquettes, the paper mat is also pressed thereon to form the desired coating. Coated briquettes 96 are discharged between the press wheels. This apparatus is preferably used with a strong charcoal structure because of high shear stress produced thereby in the charcoal. The paper mat material and the impregnation of the oxidant salt therein are substantially the same as discussed in connection with the FIG. 3 embodiment. The briquettes are dried after formation thereof.

According to the present invention, individual charcoal briquettes are produced which are of a durable nature and which are readily handled and ignited. The briquettes are capable of rapid ignition and safe ignition thereof. Once the charcoal is rapidly ignited, the thin coating applied thereto substantially disappears, and the fire behaves the same as a fire bed of ordinary charcoal briquettes.

While I have shown and described several embodiments of my invention, it will be apparent to those skilled in the art that many changes and modifications may be made without departing from my invention in its broader aspects. I therefore intend the appended claims to cover all such changes and modifications as fall within the true spirit and scope of my invention.

I claim:

1. A charcoal briquette pressed from charcoal and including at least a binder for said charcoal,
said briquette being provided with a porous fibrous coating adhered to the surface of said briquette as a porous mat for enhancing oxidation from the atmosphere, said coating substantially entirely comprising a mixture of combustible fibrous material substantially free of binder material with an oxidant salt.

2. The briquette according to claim 1 wherein said fibrous material is selected from the group consisting of paper pulp, sawdust and vegetable matter as broken into pulp,
and wherein said oxidant salt is selected from the group consisting of sodium nitrate, potassium nitrate, calcium nitrate and magnesium nitrate.

3. The briquette according to claim 1 wherein said mixture of combustible fibrous material and said oxidant salt also contains moisture,
wherein said oxidant salt is selected from the group consisting of sodium nitrate and potassium nitrate,
and wherein the percentage of nitrate in the fibrous material is between 15% and 75% of the total of the two in approximate proportion to the final moisture content of the briquette, said moisture content ranging between 3% and 15%.

4. The briquette according to claim 2 wherein said oxidant salt comprises 30% to 60% of said mixture.

5. The briquette according to claim 4 wherein said coating has a thickness between approximately 1/16 inch and 1/32 inch.

6. The method of manufacturing combustible briquettes comprising:
mixing charcoal with at least a binder therefor and pressing the mixture of charcoal and binder into individual briquettes,
mixing a fibrous coating material substantially free of binders with an oxidant salt and water to form a coating mixture,
flinging individual fibers of said coating mixture by centrifugal force toward said briquettes for coating said briquettes with said individual fibers of said coating mixture to provide an adherent porous mat thereon,
and drying said briquettes.

7. The method of manufacturing combustible briquettes according to claim 6 wherein said fibrous material is selected from the group consisting of paper pulp, sawdust and vegetable matter as broken into pulp,
and wherein said oxidant salt is selected from the group consisting of sodium nitrate, potassium nitrate, calcium nitrate and magnesium nitrate.

8. The method according to claim 7 wherein 30% to 60% of the mixture of fibrous material and oxidant salt comprises oxidant salt.

9. The method of claim 6 wherein a slurry of fibrous material and water is formed before addition of said oxidant salt to said coating mixture.

10. The method according to claim 6 wherein said coating mixture comprises paper as a fibrous material, sodium nitrate as an oxidant salt, the approximate proportions being one part paper, one part sodium nitrate and two to three parts water is applied to the briquettes, 11. The method according to claim 10 wherein said briquettes as pressed contain approximately 30% to 40% moisture,
and wherein said briquetes after being coated are dried in an oven at a temperature between 200 and 400 degrees Fahrenheit for a period between approximately 4 and 6 hours to bring the moisture content of said briquettes to approximately between 3% and 5%.

12. Apparatus for the coating of charcoal briquettes comprising:
conveying means for moving plurality of said brisuettes,
a rotating brush adjacent said conveying means for providing a spray of pulp mixture directed toward said briquettes, said rotating brush being provided with housing means having an exit adjacent said conveying means for tangential spraying of said pulp onto said briquettes from said brush, said exit extending over an appreciable width of said conveying means for directing a relatively wide spray at said briquettes, and said housing also having inlet opening through which said pulp mixture is applied to said rotating brush,
and means adjacent said inlet opening for applying the pulp mixture to said brush.

13. The apparatus according to claim 12 wherein said means for applying pulp mixture to said brush comprises a pump means provided with a rotary wheel having radially extending rubber vanes at the periphery of said wheel,
- a housing for said pump means adjacent to the housing means for said brush positioned such that said wheel causes said rubber vanes to engage the edge of the inlet opening of said brush housing means,
- and hopper and agitator means for feeding pulp mixture into said pump means.

14. The method of manufacturing combustible briquettes comprising:
- mixing charcoal with at least a binder therefor and pressing the mixture of charcoal and binder into individual briquettes,
- mixing a fibrous coating material for said briquettes with wax emulsified in water to form a coating mixture,
- coating said briquettes with said coating mixture, and drying said briquettes.

15. Apparatus for coating of charcoal briquettes comprising:
- a rotatable means comprising a rotary member and a multiplicity of outwardly extending tines,
- means for providing relative movement between said rotatable means and a plurality of said briquettes,
- means for applying a pulp mixture to said tines comprising a closed housing means, said mixture having a predetermined moisture content initially appropriate for coating said briquettes,
- and means for rotating said rotatable means at high speed for tangential spraying of said pulp mixture upon said briquettes as a mist of elemental fibrous particles for forming a porous mat on said briquettes.

16. The apparatus according to claim 15 wherein said means for applying the pulp mixture comprises a series of vanes which rotate with respect to said rotatable means for applying said mixture to said tines.

References Cited

UNITED STATES PATENTS

| | | | |
|---|---|---|---|
| 2,094,661 | 10/1937 | Macleay et al. | 44—41 |
| 2,948,594 | 8/1960 | Doyle | 44—6 |
| 3,337,312 | 8/1967 | Perlus | 44—6 |
| 2,380,499 | 7/1945 | Brend. | |

FOREIGN PATENTS 243,892   4/1963   Australia.

DANIEL E. WYMAN, Primary Examiner

C. F. DEES, Assistant Examiner

U.S. Cl. X.R.

44—6, 10, 41; 118—300

UNITED STATES PATENT OFFICE
CERTIFICATE OF CORRECTION

Patent No. 3,527,580   Dated Sept. 8, 1970

Inventor(s) Russell W. Bonlie

It is certified that error appears in the above-identified patent and that said Letters Patent are hereby corrected as shown below:

Col. 1, line 59, "as" should be -- an --

Col. 6, line 49, "is" should be -- as --

Col. 6, line 61, "brisuettes" should be -- briquettes --

SIGNED AND SEALED
JAN 19 1971

(SEAL)
Attest:

Edward M. Fletcher, Jr.
Attesting Officer

WILLIAM E. SCHUYLER, JR.
Commissioner of Patents